(12) United States Patent
Lee et al.

(10) Patent No.: US 7,656,203 B2
(45) Date of Patent: Feb. 2, 2010

(54) RECEIVING CIRCUIT AND METHOD THEREOF

(75) Inventors: Chih-Yu Lee, Taipei County (TW); Yong-Nien Rao, Hsinchu (TW); Ko-Yang Tso, Taipei County (TW); Hui-Wen Miao, Hsinchu (TW); Chin-Chieh Chao, Hsinchu (TW)

(73) Assignee: Raydium Semiconductor Corporation, Hsinchu (TW)

( * ) Notice: Subject to any disclaimer, the term of this patent is extended or adjusted under 35 U.S.C. 154(b) by 26 days.

(21) Appl. No.: 12/073,196

(22) Filed: Mar. 3, 2008

(65) Prior Publication Data
US 2008/0253482 A1 Oct. 16, 2008

(30) Foreign Application Priority Data
Apr. 11, 2007 (TW) .............................. 96112777 A (51) Int. Cl.
*H03B 1/00* (2006.01)
(52) U.S. Cl. ........................ 327/108; 327/65; 327/379
(58) Field of Classification Search .................. 327/65, 327/108, 379, 387; 375/316, 318
See application file for complete search history.

(56) References Cited
U.S. PATENT DOCUMENTS 6,650,149 B1 * 11/2003 Wong .......................... 327/65
7,479,941 B2 * 1/2009 Matsumoto et al. ........... 345/98

* cited by examiner

*Primary Examiner*—Long Nguyen
(74) *Attorney, Agent, or Firm*—Rabin & Berdo, P.C.

(57) ABSTRACT

A receiving circuit is provided for receiving a data signal and a clock signal, which are RSDS signals, and outputting an output data signal to a data driver. The receiving circuit includes a data comparator, a data intermediate circuit, a clock comparator, a clock intermediate, and a flip-flop. The data comparator, driven with a data bias current, receives the data signal, and outputs a compared data signal. The clock comparator, driven with a clock bias current, receives the clock signal, and outputs a compared clock signal. The flip-flop receives the compared data signal via the data intermediate circuit and the compared clock signal via the clock intermediate circuit. The phase difference between the compared data signal and the compared clock signal is improved by adjusting the data and the clock bias currents.

14 Claims, 7 Drawing Sheets

RECEIVING CIRCUIT AND METHOD THEREOF

This application claims the benefit of Taiwan application Serial No. 96112777, filed Apr. 11, 2007, the subject matter of which is incorporated herein by reference.

BACKGROUND OF THE INVENTION

1. Field of the Invention

The invention relates in general to a receiving circuit for a data driver, and more particularly to a receiving circuit for receiving a reduced swing differential signal (RSDS).

2. Description of the Related Art

Figure 1:
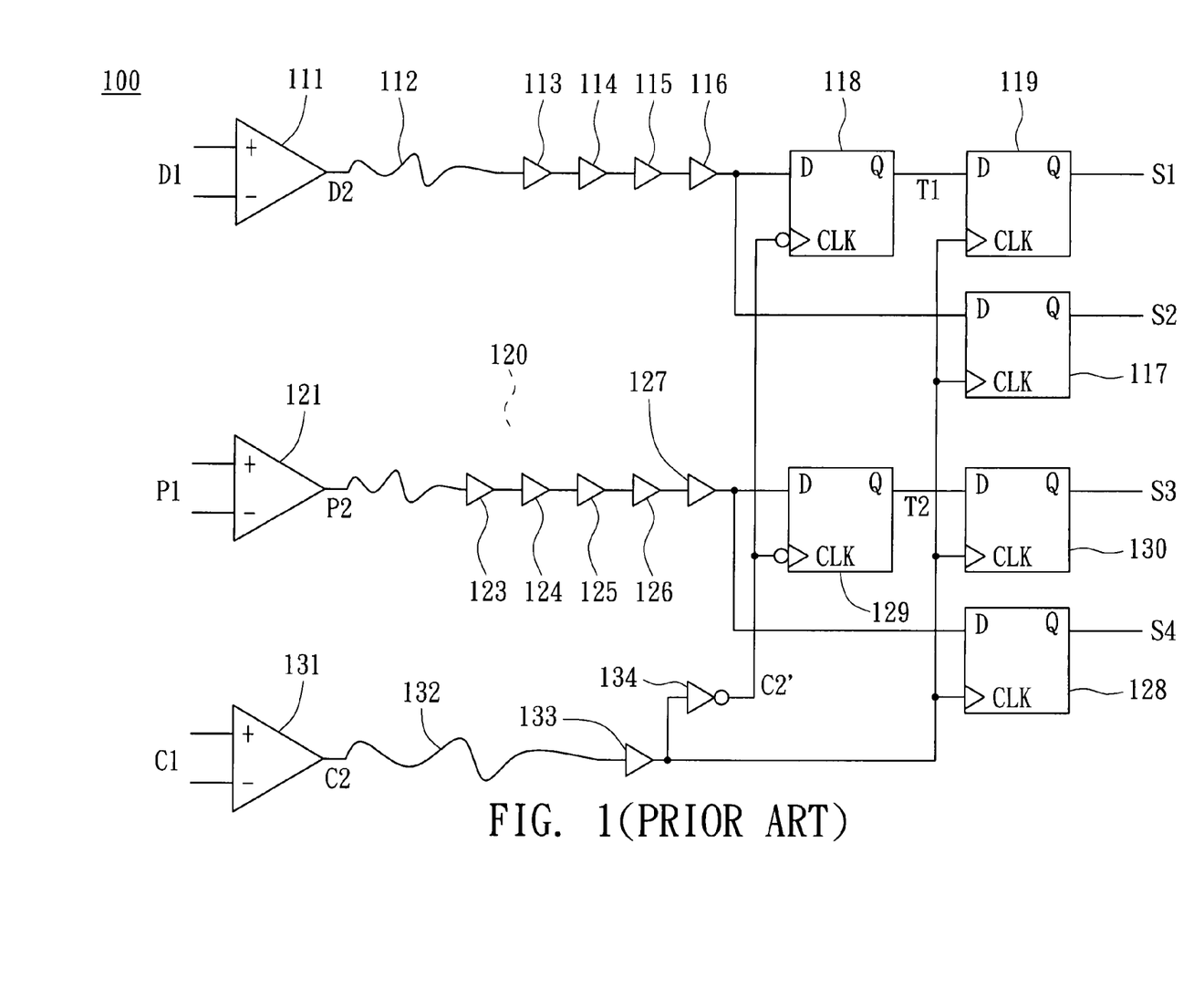
FIG. 1 shows a conventional receiving circuit 100 for receiving a reduced swing differential signal (RSDS).

FIG. 1 shows a conventional receiving circuit 100 for receiving a reduced swing differential signal (RSDS). The receiving circuit 100 receives input differential data signals D1 and P1, and generates output data signals S1 to S4. The input data signals D1 and P1 and the input clock signal C1 are all RSDSs.

Referring to FIG. 1, the comparator 131 receives the input clock signal C1 and generates a compared clock signal C2. The compared clock signal C2 is transmitted to flip-flops 117, 119, 128 and 130 via a wire 132 and a buffer 133. After the compared clock signal is transmitted via wire 132, buffer 133 and an inverter 134, the compared clock signal C2 is inverted to produce an inverse compared clock signal C2'. Then the inverse compared clock signal C2' is transmitted to flip-flops 118 and 129. The flip-flops 117, 119, 128 and 130 are positive edge-triggered. The flip-flops 118 and 129 are both negative edge triggered.

The comparator 111 receives an input data signal D1 and generates a compared data signal D2. The compared data signal D2 is transmitted to the flip-flops 117 and 118 via a wire 112 and buffers 113 to 116.

The flip-flops 117 and 118 produce an output data signal S2 and a negative edged data signal T1 from the compared data signal D2, respectively, according to the compared clock signal C2 and the inverse compared clock signal C2'. The negative edged data signal T1 is then transmitted via a positive edge triggered flip-flop 119. The flip-flop 119 adjusts the timing of the negative edged data signal T1 to generate an output data signal S1.

Similarly, the comparator 121 receives the input data signal P1 and generates a compared data signal P2. The compared data signal P2 is transmitted to the flip-flops 128 and 129 via a wire 122 and buffers 123 to 127. The flip-flops 128 and 129 produce an output data signal S4 and a negative edged data signal T2, respectively, from the compared data signal P2 according to the compared clock signal C2 and the inverse clock signal C2'. The negative edged data signal T2 is then transmitted via a positive edge triggered flip-flop 130. The flip-flop 130 adjusts the timing of the negative edged data signal T2 to generate an output data signal S3. The circuit structures of the data comparators 111, 121 and a clock comparator 131 are the same.

Since the input clock signal C1 lags the input data signals D1 and P1, the buffers are positioned after the wires 112 and 122 to delay the compared data signals D2 and P2.

In addition, since in the conventional receiving circuit 100, the distance between the comparator 111 and its corresponding flip-flop, and the distance between the comparator 121 and its corresponding flip-flop are not equal, the wires 112 and 122 have different lengths. Therefore, the delay time after the compared data signal D2 is transmitted via the wire 112 is unequal to the delay time after the compared data signal P2 is transmitted via the wire 122. To compensate for the different delay times, different numbers of buffers are used after the wires 112 and 122. For buffering the compared data signal D2, four buffers 113 to 116 are used, and for buffering the compared data signal P2, five buffers 123 to 127 are used. Thus, the total delay time after the compared data signal D2 is transmitted via the wire 112 and the buffers 113 to 116, is more consistent with the delay time after the compared data signal P2 is transmitted via the wire 122 and the buffers 123 to 127.

A buffer is very sensitive to its driving voltage. When the driving voltage changes, the delay time of the buffer, changes. Thus, when a conventional receiver is used under different driving voltages, the delay times of the buffers change. Thus, the delay times after the compared data signals D2 and P2 are transmitted via the two ways will still be different again.

Figure 2:
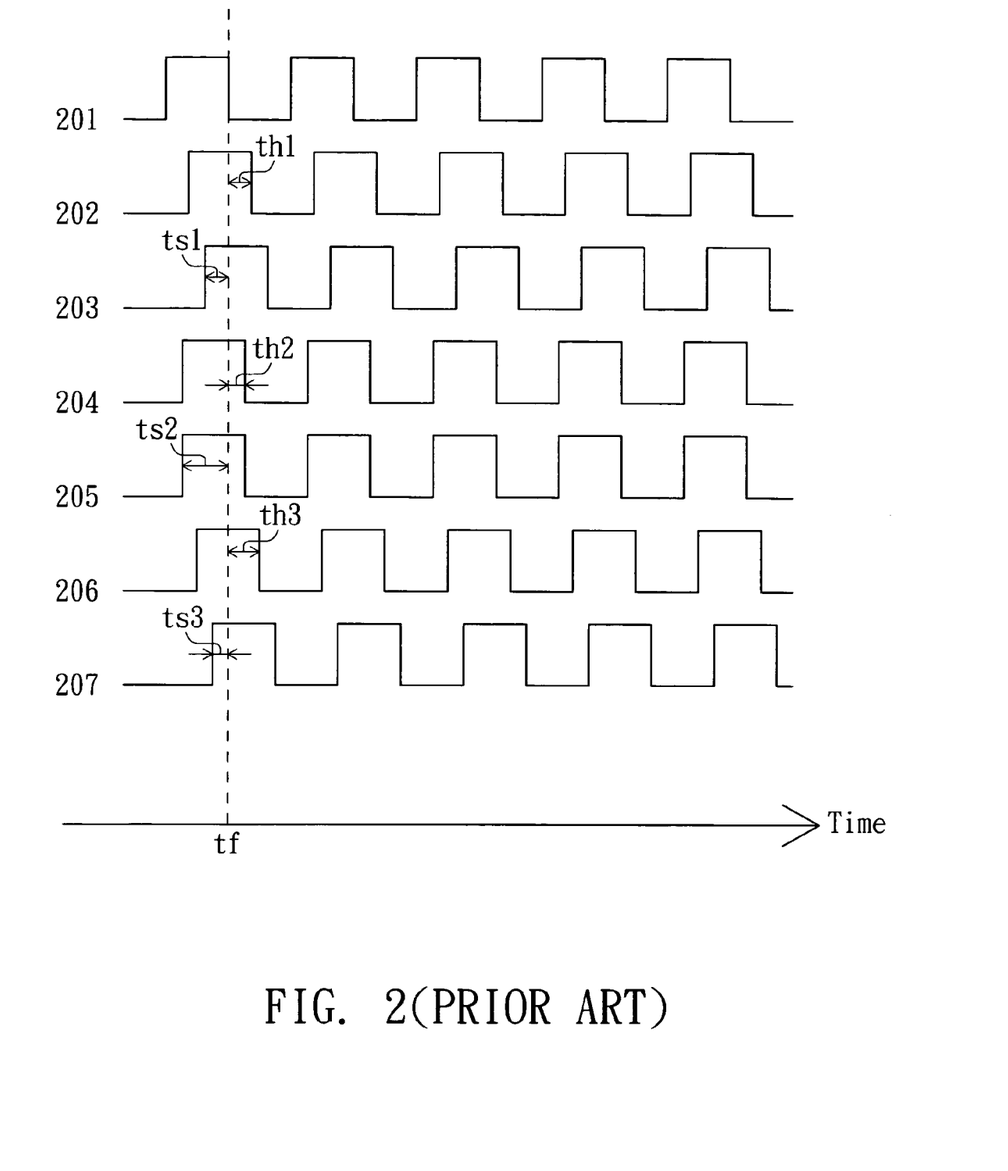
FIG. 2 shows an example of relationship between a compared data signal and a compared clock signal received by a flip-flop in the conventional receiving circuit under different driving voltages.

FIG. 2 shows an example of the relationship between the compared data signal D2 and the compared clock signal C2 received by the flip-flop 117 in a conventional receiving circuit under different driving voltages. The compared data signal D2 and the compared clock signal C2 are transmitted via the wire 112 and the buffers 113 to 116 before being received by the flip-flop 117. Referring to FIG. 2, the waveform 201 is the waveform of the compared clock signal. The waveforms 202 and 203 are the waveforms of the data signal D2 in the conventional receiving circuit 100 in, respectively, the hold time condition and the setup time condition when the driving voltage is 3.3 V.

The waveforms 204 and 205 are the waveforms of the compared data signal D2 in the conventional receiving circuit 100 in, respectively, the hold time condition and the setup time condition when the driving voltage is 3.6 V. The waveforms 206 and 207 are the waveforms of the compared data signal D2 in, respectively, the hold time condition and the setup time condition when the driving voltage is 2.2 V.

At the time point tf, the waveform 201 forms a negative edge. Take the flip-flop 117 to be a negative edge triggered flip-flop as an example. In FIG. 2, the hold times th1, th2, and th3 formed by the waveforms 202 and 201, 204 and 201, and 206 and 201, respectively, are unequal. The setup times ts1, ts2, and ts3 formed by the waveforms 203 and 201, 205 and 201, and 207 and 201, respectively, are also unequal. Hence, different driving voltages will change the delay times of the buffers in the flip-flop 117, so that the phase difference between the compared data signal and the compared clock signal will change.

After the compared data signal D1 is transmitted via the wire 112 and the buffers 113 to 116, the setup time and the hold time formed by the compared data signal D1 and the compared clock signal C2 will not match the setup time and the hold time required by the flip-flop 117. Thus the flip-flop 117 may output an incorrect output data signal S2. From the above, if the conventional receiving circuit is to be used under different driving voltage conditions, the influence of the driving voltage on the buffers must be considered, which is very inconvenient for the designer Also, the inverse compared clock signal C2' is generated by the inverter 134. It will cause a phase difference between the inverse compared clock signal C2' and the compared clock signal C2, which means the two clock signals C2 and C2' have different phases. Therefore, the negative edge triggered flip-flops 118 and 129 may output incorrect negative edged data signals T1 and T2 from the compared data signals D1 and D2.

SUMMARY OF THE INVENTION

The invention is directed to a receiving circuit. By adjusting the bias currents for driving the comparators in the receiving circuit, such that the phase difference between the compared data signal and the compared clock signal generated by the comparators can match the setup time and the hold time required by the corresponding flip-flops. Furthermore, when the receiving circuit is applied under different driving voltages, the bias currents will not be changed. Thus, the phase difference between the compared data signal and the compared clock signal generated by the comparators will not change when the driving voltage changes.

According to a first aspect of the present invention, a receiving circuit is provided. The receiving circuit receives a first data signal and a clock signal to generate a first output data signal to a data driver. The first data signal and the clock signal are both RSDSs. The receiving circuit includes a first data comparator, a first data intermediate circuit, a clock comparator, a first clock intermediate circuit and a first flip-flop. The first data comparator is driven by a data bias current and receives the first data signal to generate a first compared data signal. The first data intermediate circuit receives the first compared data signal. The clock comparator is driven by a clock bias current and receives the clock signal to generate a first compared clock signal. The first clock intermediate circuit receives the first compared clock signal. The first flip-flop receives the first compared data signal, transmitted from the first data intermediate circuit, and the first compared clock signal, transmitted from the first clock intermediate circuit, so as to generate the first output data signal. At least one of the clock bias current and the data bias current is adjusted such that the setup time and the hold time formed by the first compared data signal and the first compared clock signal match the setup time and the hold time required by the first flip-flop.

According to a second aspect of the present invention, a method for receiving a RSDS for a receiving circuit is provided. The receiving circuit includes a first data comparator, a clock comparator and a first flip-flop. The method includes the following steps. Firstly, drive the first data comparator with a data bias current, so that the first data comparator receives the first data signal to generate a first compared data signal to the first flip-flop. Next, drive the clock comparator with a clock bias current, so that the clock comparator receives the clock signal to generate a first compared clock signal to the first flip-flop. Then, adjust at least one of the clock bias current and the data bias current, such that the setup time and the hold time formed by the first compared data signal and the first compared clock signal match the setup time and the hold time required by the first flip-flop, and such that the first flip-flop can generate a first output data signal according to the first compared data signal and the first compared clock signal.

The invention will become apparent from the following detailed description of the preferred but non-limiting embodiments. The following description is made with reference to the accompanying drawings.

DETAILED DESCRIPTION OF THE INVENTION

First Embodiment

Figure 3:
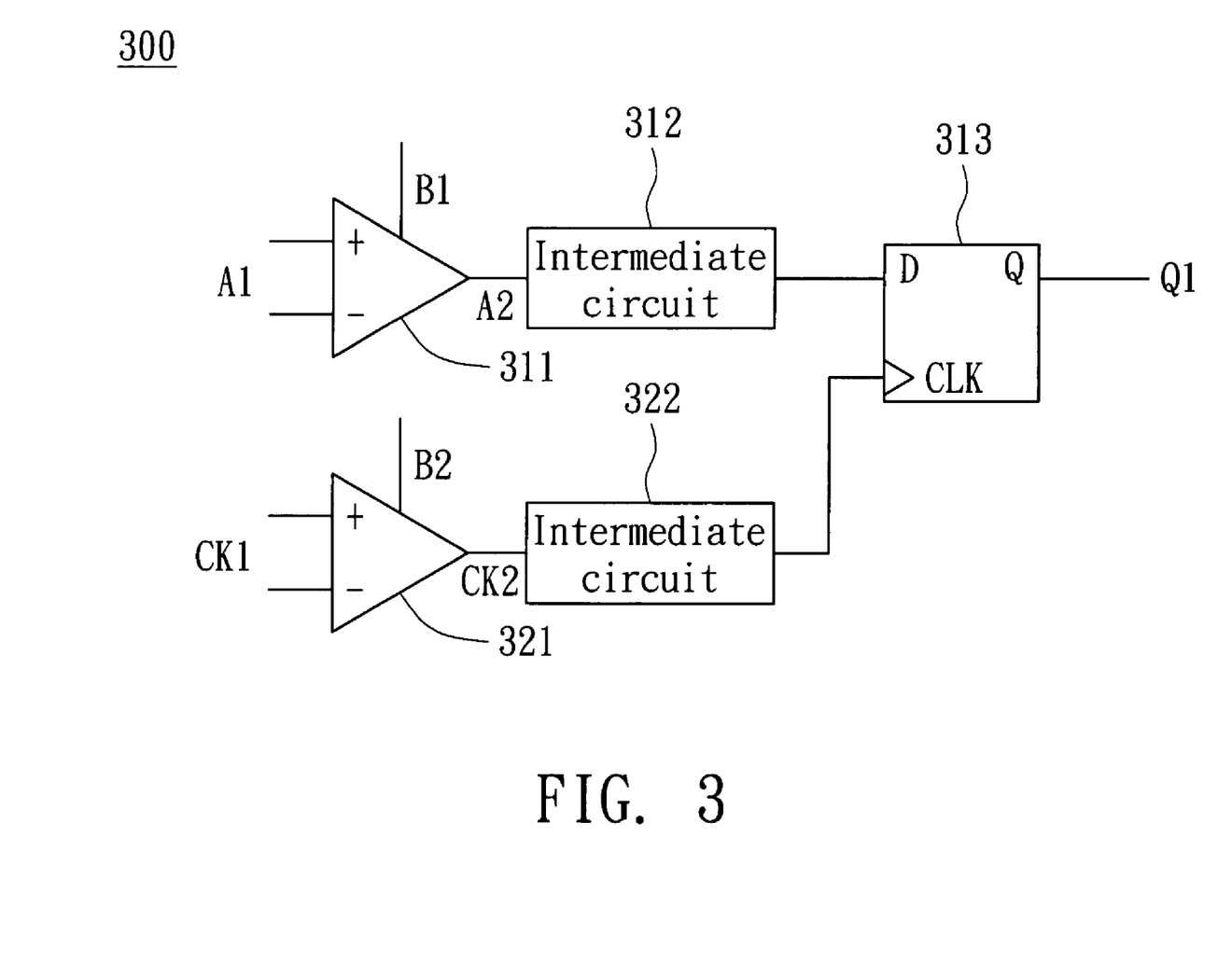
FIG. 3 shows a circuit diagram of a receiving circuit according to the first embodiment.

FIG. 3 shows a circuit diagram of a receiving circuit according to the first embodiment. The receiving circuit 300 according to the first embodiment receives an input data signal A1 to generate an output signal Q1 according to an input clock signal CK1. The input signal A1 and the input clock signal CK1 are both RSDSs. The receiving circuit 300 includes comparators 311 and 321, intermediate circuits 312 and 322, and a flip-flop 313. In the first embodiment, the flip-flop 313 is exemplified to be a D flip-flop.

Referring to FIG. 3, the comparator 311 is driven by a bias current B1 and receives an input data signal A1 to output a compared data signal A2 to the intermediate circuit 312. From the intermediate circuit 312, the compared data signal A2 is the input to the flip-flop 313.

The comparator 321 is driven by the bias current B2 and receives an input clock signal CK1 to output a compared clock signal CK2 to the intermediate circuit 322. From the intermediate circuit 322, the compared clock signal CK2 is the input to the flip-flop 313. The flip-flop 313 then produces the output data signal Q1 from the compared data signal A2 according to the compared clock signal CK2.

At least one of the bias currents B1 and B2 is adjusted so that the setup time and the hold time formed by the compared data signal A2 generated by the comparator 311, and the compared clock data signal CK2 generated by the comparator 321 match the setup time and the hold time required by the flip-flop 313.

Since the phase difference by which the input clock signal CK1 lags the input data signal A1 is large, the phase difference between the compared clock signal CK2 and the compared data signal A2 must be adjusted. Since the delay times of the comparators vary according to their bias currents, the phase difference between the compared clock signal and the compared data signal can be adjusted by adjusting the bias currents.

The comparators 311 and 321 in the receiving circuit 300 in the first embodiment are driven by the different bias currents B1 and B2, respectively. Since the comparator 321 is driven by the bias current B2, which is larger than the bias current B1, the phase of the compared clock signal CK2 generated by the comparator is shifted forward. Therefore the phase difference between the compared data signal A2 and the compared clock signal CK2 is reduced. Thus, the setup time and the hold time formed by the compared data signal A2 and the compared clock signal CK2 match the setup time and the hold time required by the flip-flop 313. In this way the flip-flop 313 produces the correct output data signal Q1.

Since the bias currents for driving the comparators are independent of the driving voltage applied to the receiving circuit, the delay time that the comparators generate for the compared data signal and the compared clock signal will not be affected when the receiving circuit is used under different driving voltages. Thus, the phase difference of the compared data signal and the compared clock signal can match the setup time and the hold time required by the flip-flop. Hence, the receiving circuit in the first embodiment can be used under different driving voltages directly.

Second Embodiment

Figure 4:
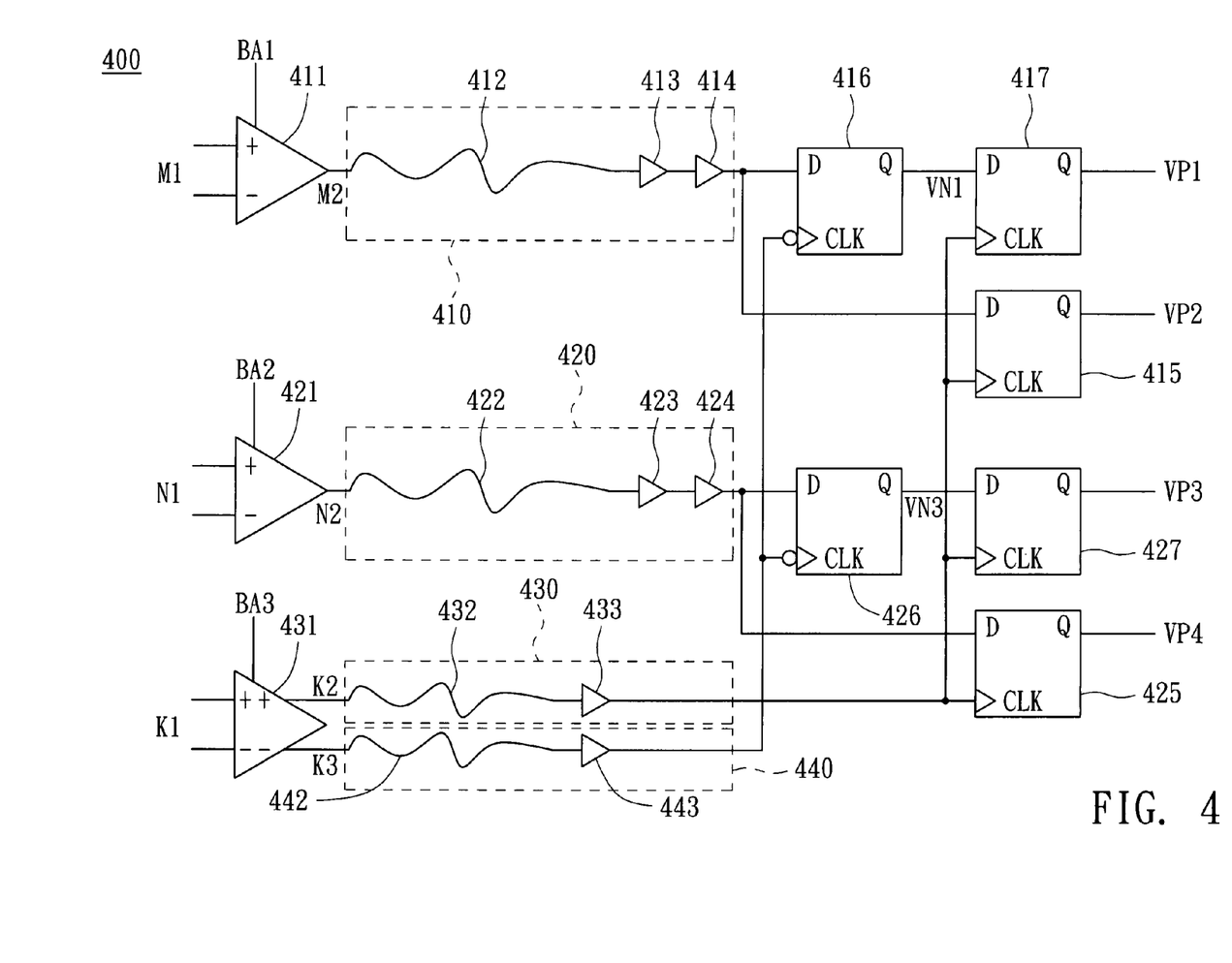
FIG. 4 shows a circuit diagram of a receiving circuit according to the second embodiment.

FIG. 4 shows a circuit diagram of a receiving circuit in the second embodiment. The receiving circuit 400 in the second embodiment receives input data signals M1 and N1 and produces output data signals VP1 to VP4 according to the input clock signal K1. The input data signals M1, N1 and the input clock signal K1 are all RSDSs. The receiving circuit 400 includes data comparators 411 and 421, a clock comparator 431, intermediate circuits 410, 420 and 430, buffers 413, 414, 423, 424, 433 and 443, and flip-flops 415, 416, 417, 425, 426 and 427. The flip-flops 415, 417, 425 and 427 are exemplified to be positive edge-triggered D flip-flops. The flip-flops 416 and 426 are exemplified to be negative edge-triggered D flip-flops.

The comparator 431 is driven by a bias current BA3 and receives an input current signal K1, and outputs a first compared clock signal K2 and a second compared clock signal K3 to the intermediate circuits 430 and 440, respectively. The first compared clock signal K2 and the second compared clock signal K3 have the same phases but inverse polarities. The first compared clock signal K2 is transmitted to the positive edge triggered flip-flops 415, 417, 425 and 427 via the intermediate circuit 430. The second compared clock signal K3 is transmitted to the negative edge triggered flip-flops 416 and 426 via the intermediate circuit 440.

The comparator 411 is driven by a bias current BA1 and receives an input data current M1 to output a compared data signal M2 to the intermediate circuit 410. The compared data signal M2 is transmitted to the flip-flops 415 and 416 via the intermediate circuit 410. Then the flip-flops 415 and 416, respectively, produce an output data signal VP2 and a negative edged data signal VN1 from the compared data signal M2 according to the first and second compared clock signals K2 and K3. The positive edge triggered flip-flop 417 receives the negative edged data signal VN1, adjusts the timing of the negative edged data signal VN1, and accordingly generates the output data signal VP1.

The comparator 421 is driven by a bias current BA2 and receives the input data signal N1 and accordingly outputs a compared data signal N2 to the intermediate circuit 420. The compared data signal N2 is the input to the flip-flops 425 and 246 via the intermediate circuit 420. The flip-flops 425 and 426 produce the output data signals VP4 and a negative edged data signal VN3 from the compared data signal N2 according to the first and second compared clock signals K2 and K3. The positive edge triggered flip-flop 427 receives the negative data signal VN3, adjusts the timing of the negative edged data signal VN3 and accordingly generates the output data signal VP3.

Since the input clock signal K1 lags the input data signals M1 and N1 by a large amount, the bias currents BA1, BA2 and BA3 have to be adjusted so as to adjust the delay times of the comparators 411, 421 and 431. By adjusting the bias currents BA1, BA2 and BA3, the phase differences formed by the compared data signals M2 and N2, and the first and second compared clock signals K2 and K3 can match the setup times and the hold times required by the flip-flops in the receiving circuit 400.

By adjusting at least one of the bias currents BA1 and BA3, the delay times of the comparators 411 and 431 are adjusted so that the setup time and the hold time formed by the compared data signal M2 and the first compared clock signal K2 can match the setup time and the hold time requirement of the flip-flop 415. Also, the delay times of the comparators 411 and 431 are adjusted so that the setup time and the hold time formed by the compared data signal M2 and the second compared clock signal K3 can match the setup time and the hold time requirement of the flip-flop 416.

For example, if the setup time and the hold time required by each flip-flop in the receiving circuit are the same, the bias current BA3 is adjusted so that the setup time and the hold time formed by the compared data signal M2 and the first compared clock signal K2 are the same, and the setup time and the hold time formed by the compared data signal M2 and the first compared clock signal K3 are also the same.

Similarly, by adjusting at least one of the bias currents BA2 and BA3, the delay times of the comparators 421 and 431 are adjusted so that the setup time and the hold time formed by the compared data signal N2 and the first compared clock signal K2 can match the setup time and the hold time requirement of the flip-flop 425. And similarly, the delay times of comparators 421 and 431 are adjusted so that the setup time and the hold time formed by the compared data signal N2 and the second compared clock signal K3 can match the setup time and the hold time requirement of the flip-flop 426.

From above, by adjusting the bias currents driving the comparators to adjust the delay time of the comparators, the phase difference between the compared data signal and the first compared clock signal, and the phase difference between the compared data signal and the second compared clock signal are reduced, so that the setup time and the hold time requirement of each flip-flop are satisfied.

The intermediate circuits 410, 420, 430 and 440 are explained in detail. The intermediate circuit 410 includes a wire 412 and buffers 413 and 414. The compared data signal M2 is transmitted to the flip-flops 415 and 416 via the wire 412 and buffers 413 and 414.

The intermediate circuit 420 includes a wire 422 and buffers 423 and 424. Similarly, the compared data signal N2 is transmitted to the flip-flops 425 and 426 via the wire 422 and buffers 423 and 424.

The intermediate circuit 430 includes a wire 432 and a buffer 433. The first compared clock signal K2 is transmitted to the flip-flops 415, 417, 425 and 427 via the wire 432 and the buffer 433. The intermediate circuit 440 includes 442 and the buffer 443. The second compared clock signal K3 is transmitted to the flip-flops 416 and 426 via the wire 442 and the buffer 443.

In FIG. 4, the wires 412 and 422 are adjusted to have the same lengths. The numbers of the buffers connected with the two wires are the same. In the second embodiment, the wires 412 and 422 are exemplified to connect to two buffers.

When the distances between the comparator 411 and the flip-flop 415 and between the comparator 411 and the flip-flop 416 are greater than the distances between the comparator 421 and the flip-flop 425 and between the comparator 421 and the flip-flop 426, respectively, the time required for the compared data signal M2 to reach the flip-flops 415 and 416 from the comparator 411 is longer than the time required for the compared data signal N2 to reach the flip-flops 425 and 426 from the comparator 421. Therefore, the wire 422 is lengthened so that it is substantially equal to that of the wire 412. On the contrary, the wire 412 is extended, so that the length of the wire 412 is substantially equal to that of the wire 422.

Since the input clock signal K1 lags the input data signals M1 and N1, the wires 412, 422, 432 and 442 can be adjusted accordingly. After being adjusted, the wires 432 and 442 through which the first and second compared clock signals K2 and K3 are transmitted are shorter than the wires 412 and 422 through which the compared data signals M2 and N2 are transmitted. In addition, the numbers of the buffers connected with the wires 433 and 443 can also be adjusted. In the second embodiment, the wires 433 and 443 are exemplified to connect to one buffer.

From the above disclosure, by preferably adjusting the lengths of the wires and the number of the buffers to which each wire is connected, the phase differences between the first compared clock signal K2 and the compared data signal M2, between the first compared clock signal K2 and the compared data signal N2, between the second compared clock signal K3 and the compared data signal M2, and between the second compared clock signal K3 and the compared data signal N2 are all reduced. In this way, the phase differences can match the setup times and the hold times required by the corresponding flip-flops.

The effect of the second embodiment is now explained. In the second embodiment, the bias currents driving the comparators are adjusted so that the phase differences matches the setup times and the hold times required by the flip-flops. Therefore, the flip-flops can generate the output data signal correctly. Since the bias currents do not vary with the driving voltage, when the receiving circuit is used under different driving voltages, the bias currents will not change. Thus, the phase differences will not change when the driving voltage changes.

In addition, since the phase differences are adjusted by adjusting the bias currents driving the comparators, it is not necessary to connect too many buffers with each intermediate circuit located between each comparator and each flip-flop. Since the delay times of the buffers are strongly influenced by the driving voltage, the receiving circuit 200, which uses fewer buffers, is less affected by the driving voltage compared with the conventional receiving circuit 100 in FIG. 1, which uses too many buffers.

Figure 5:
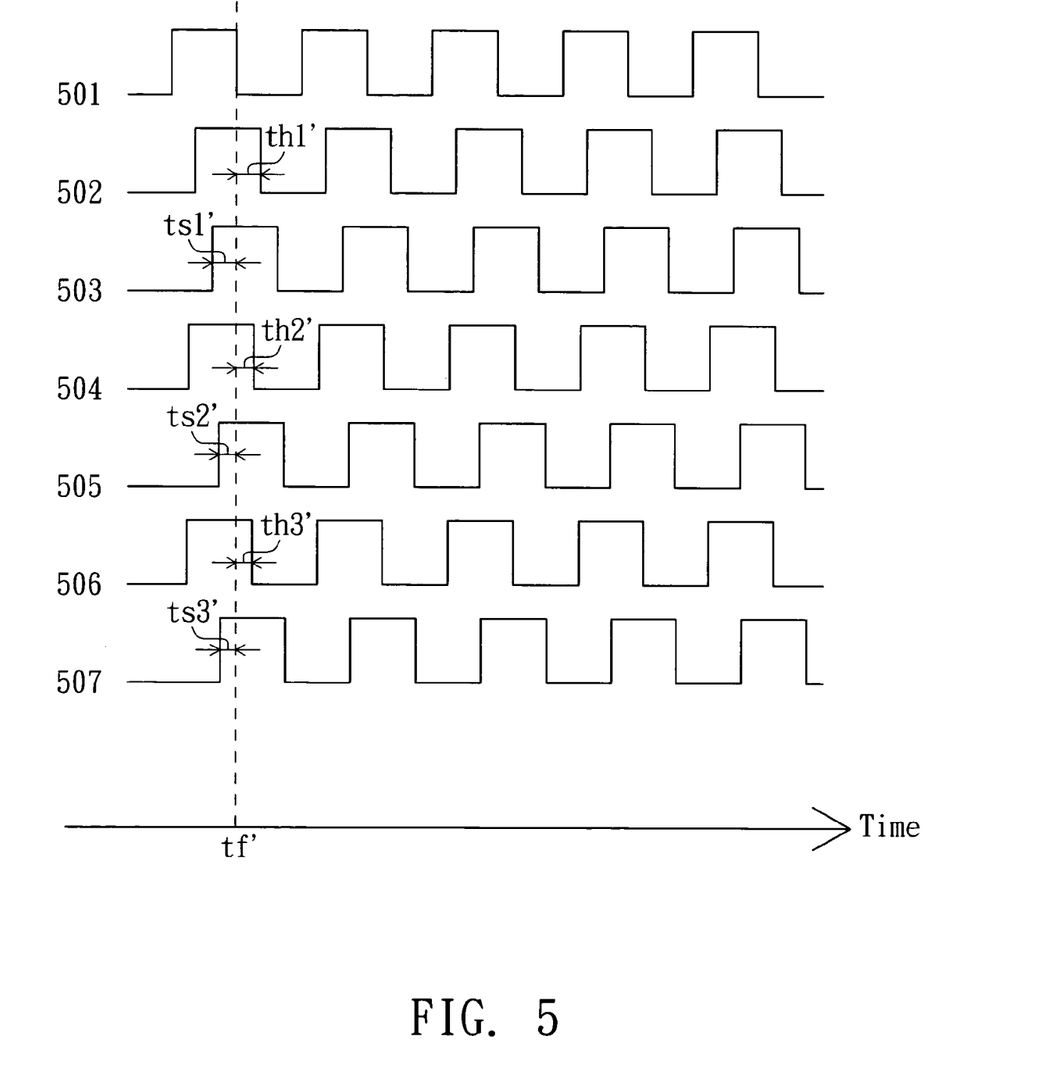
FIG. 5 shows an example of a relationship between a compared data signal and a first compared clock signal under different driving voltages, after bias currents for the receiving circuit in FIG. 4 are adjusted.

FIG. 5 shows an example of the relationship between the compared data signal M2, which is transmitted via the wire 412, the buffers 413 and 414, and the first compared clock signal K2, which is transmitted via the wire 432 and the buffers 433, under different driving voltages after the bias currents BA1 and BA3 for the receiving circuit 400 are adjusted. The setup time and the hold time required by the flip-flop 415 are equal, for example.

Referring to FIG. 5, the waveform 501 is the waveform of the compared clock signal K2. The waveforms 502 and 503 are the waveforms of the compared data signal M2 in the hold time condition and the setup time condition, respectively, when the driving voltage for the receiving circuit 400 is 3.3 V.

The waveforms 504 and 505 are the waveforms of the compared data signal M2 in the setup time condition and the hold time condition, respectively, when the driving voltage for the receiving circuit 400 is 3.6 V. The waveforms 506 and 507 are the waveforms of the compared data signal M2 in the setup time condition and the hold time condition, respectively, when the driving voltage for the receiving circuit 400 is 2.2 V.

Take the flip-flop 415 to be a negative edge triggered flip-flop for example. At time Tf, the waveform 501 forms a negative edge. The setup times ts1', ts2', and ts3' formed by the waveforms 501 and 503, 501 and 505, 501 and 507, respectively, are all the same. Meanwhile, the hold time th1', th2', and th3' formed by the waveforms 501 and 502, 501 and 504, and 501 and 506, respectively, are also all the same. The setup times and the hold times match the setup time and the hold time required by the flip-flop 415.

From FIG. 5, after the bias currents BA1 and BA3 of the comparators 411 and 431 are adjusted so that the setup time and the hold time formed by the compared data signal M2 and the compared clock signal K2 can match the setup time and the hold time required by the flip-flop 415, different driving voltages for the receiving circuit will not change the delay time of the compared data signal M2. Thus, the phase difference between the compared data signal M2 and the first compared clock signal K2 will not vary with different driving voltages.

In FIG. 5, the setup time and the hold time formed by the compared data signal M2 and the compared clock signal K2 under different driving voltages are used as an example to explain that the receiving circuit 400 in the second embodiment is not influenced by its driving voltage. Similarly, after adjusting the bias current BA2 of the comparator 421 and the bias current BA3 of the comparator 431, the setup time and the hold time formed by the compared data signal N2 and the compared clock signal K2 will not change with different driving voltages.

Also, in the second embodiment, although the distances between the comparator 411 and the flip-flop 415, and between the comparator 411 and the flip-flop 416 are not equal to the distances between the comparator 421 and the flip-flop 425, and between the comparator 421 and the flip-flop 426, by adjusting the lengths of the wires 412 and 422 to be the same, the delay time for transmitting the compared data signal M2 to the flip-flops 415 and 416 can be made equal to the delay time for the compared data signal N2 to be transmitted to the flip-flops 425 and 426. Therefore, the phases of the compared data signals M2 and N2 are substantially the same.

Furthermore, in the second embodiment, the comparator 431 generates the first compared clock signal K2 and the second compared clock signal K3, which have the same phases and the inverse polarities. Therefore, before the second compared clock signal K3 is transmitted to the negative edge triggered flip-flops 416 and 426, the second compared clock signal K3 does not need to pass through an inverter. Therefore, the inverter will not delay the second compared clock signal K2. However, in the conventional receiving circuit 100 in FIG. 1, before the compared clock single is transmitted to a negative edge triggered flip-flop, an inverter must be used to invert the compared clock signal, which causes the compared clock signal to be delayed. Therefore, in comparison with the receiving circuit, all clock signals received by the flip-flops in the receiving circuit according to the second embodiment have the same phases.

Figure 6:
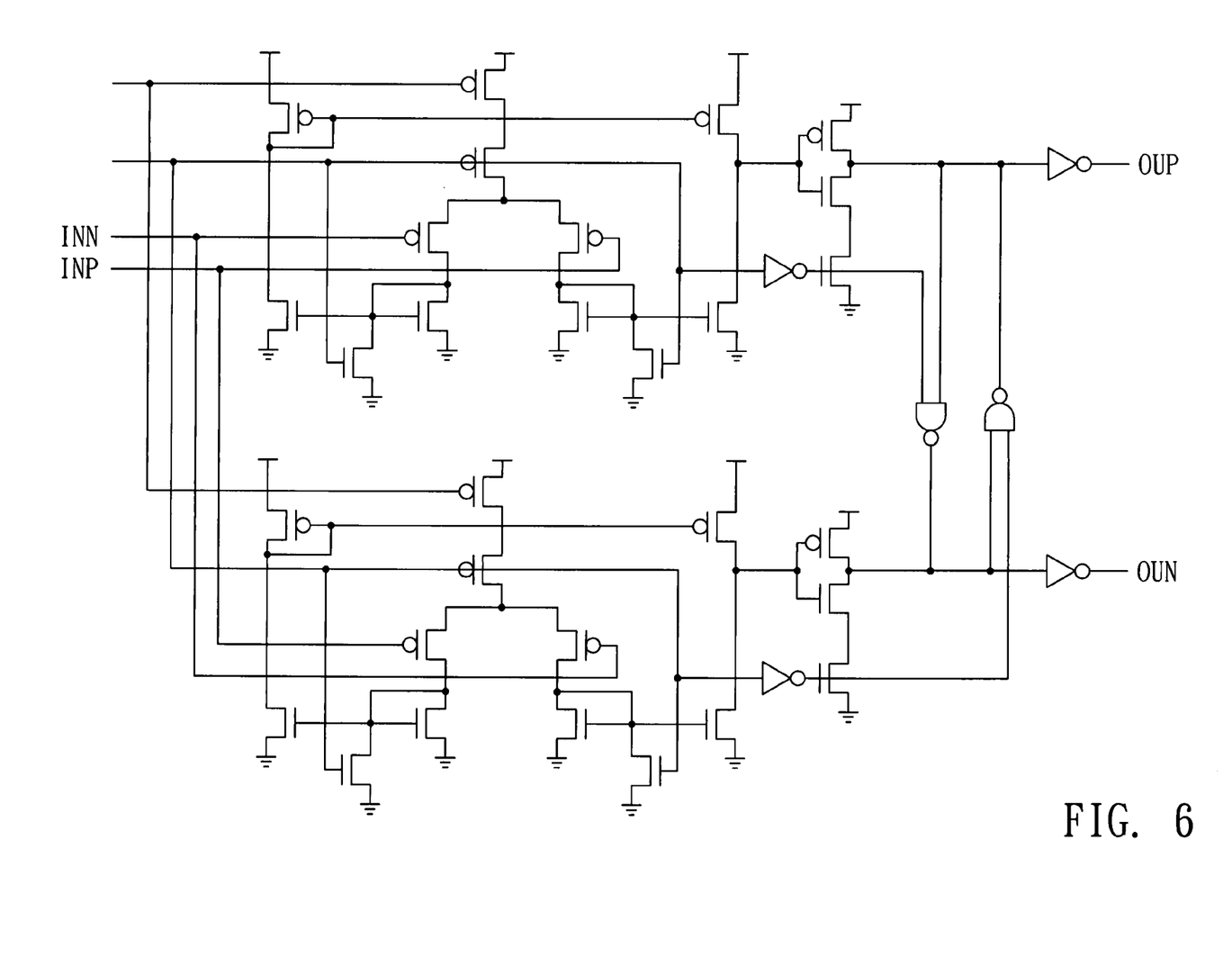
FIG. 6 shows an example of a circuit diagram of a comparator in the receiving circuit

FIG. 6 shows an example of a circuit diagram of the comparator 431 in the receiving circuit 400. The comparator receives the input clock signal K1 with a positive input INP and a negative input INN, and generates the first compared clock signal K2 and the second compared clock signal K3 from a positive output OUP and a negative output OUN.

In the second embodiment, the receiving circuit 400 is exemplified to receive the two input data signals M1 and N1. In practice, the receiving circuit can receive more RSDSs.

Figure 7:
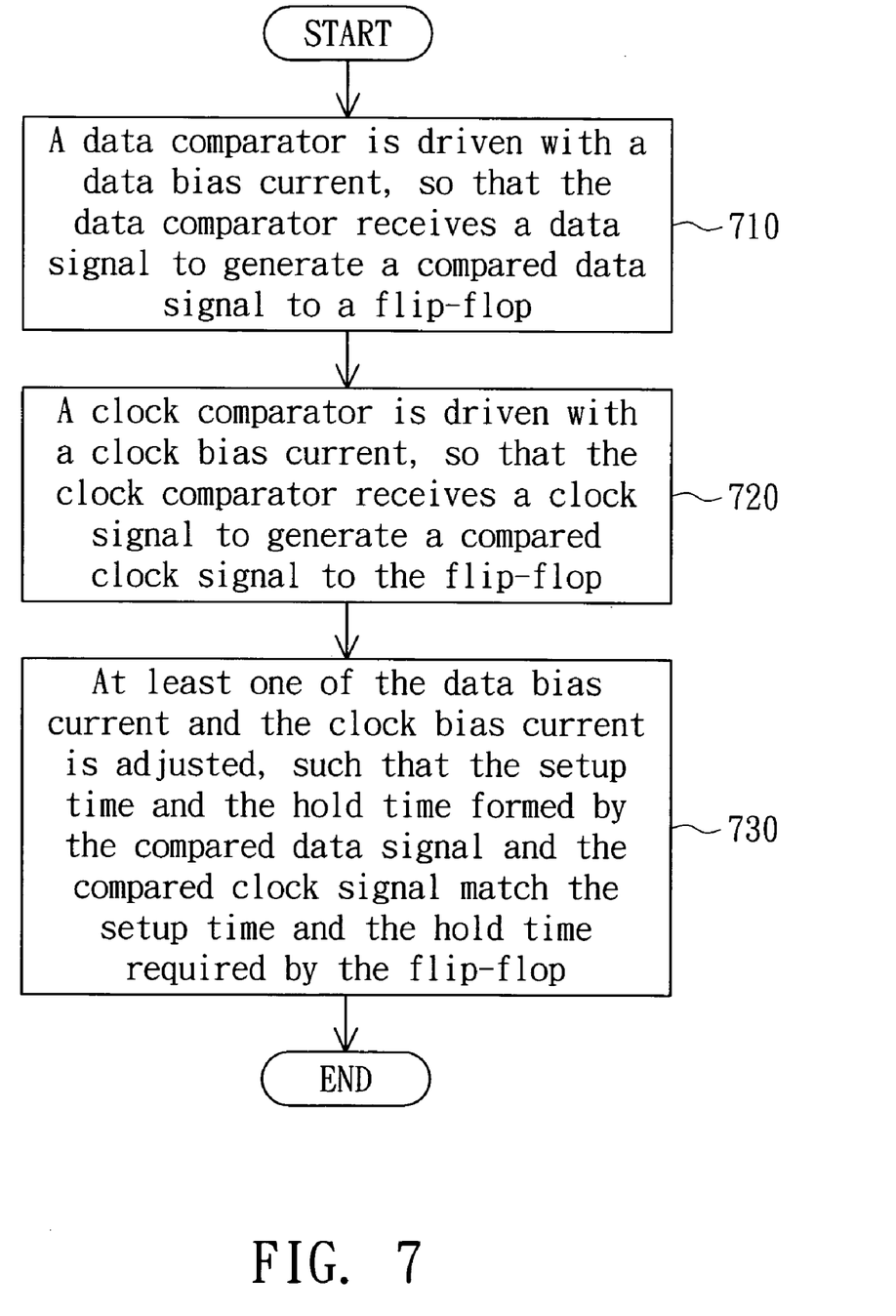
FIG. 7 shows a flowchart of a receiving method according to an embodiment.

FIG. 7 shows a flowchart of a receiving method according to an embodiment. This receiving method is used in the receiving circuit 300. First, in step 710, the data comparator 311 is driven with the data bias current B1 so that the data comparator 311 receives the data signal A1 to output the compared data signal A2 to the flip-flop 313. In step 720, the clock comparator 321 is driven with the clock bias current B2, so that the clock comparator 321 receives the clock signal CK1 to output the compared clock signal CK2 to the flip-flop 313. In step 730, at least one of the data bias current B1 or the clock bias current B2 is adjusted so that the setup time and the hold time formed by the compared data signal A2 and the compared clock signal CK2 match the setup time and the hold time required by the flip-flop 313. Thus, the flip-flop 313 can generate the output data signal Q1 according to the compared data signal A2 and the compared clock signal CK2.

In the receiving circuits according to the first and second embodiments, since the phase difference between each input data signal and its corresponding input clock signal is too large, the bias currents for driving the comparators are adjusted so that the phase difference between each data signal and its corresponding clock signal generated by the comparators match the setup time and the hold time required by the corresponding flip-flops. When the receiving circuit is used under different driving voltages, the bias currents do not vary with different voltages. And so, the delay times of the comparators do not vary with different voltages. Thus, the phase differences between the compared data signals and the compared clock signals generated by the comparators do not vary with different driving voltages. Therefore, the receiving circuit is applicable to different driving voltages.

Furthermore, in the second embodiment, the clock comparator generates two compared clock signals which have the same phases and inverse polarities to a positive edge triggered flip-flop and a negative edge triggered flip-flop. Therefore, in comparison with the conventional receiving circuit, before one of the compared clock signals is transmitted to its corresponding flip-flop, the compared clock signal does not need to pass through an inverter. Thus, the positive edge triggered flip-flops and the negative edge triggered flip-flops receive the compared clock signals with the phases substantially the same. Therefore, compared to the conventional receiving circuit, the receiving circuit of the invention can obtain correct output data according to the compared clock signals.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A receiving circuit, for receiving a first data signal and a clock signal to generate a first output data signal to a data driver, the first data signal and the clock signal being both reduced swing differential signals (RSDSs), the receiving circuit comprising:
   a first data comparator, driven by a data bias current, for receiving the first data signal to generate a first compared data signal;
   a first data intermediate circuit, for receiving the first compared data signal;
   a clock comparator, driven by a clock bias current, for receiving the clock signal to generate a first compared clock signal;
   a first clock intermediate circuit, for receiving the first compared clock signal; and
   a first flip-flop, for receiving the first compared data signal, transmitted from the first data intermediate circuit, and the first compared clock signal, transmitted from the first clock intermediate circuit, so as to generate the first output data signal;
   wherein at least one of the clock bias current and the data bias current is adjusted such that the setup time and the hold time formed by the first compared data signal and the first compared clock signal match the setup time and the hold time required by the first flip-flop.

2. The receiving circuit according to claim 1, wherein the receiving circuit further generates a second output data signal, the clock comparator further generates a second compared clock signal according to the clock signal, the polarities of the first and second compared clock signals are inverse to each other, and the phases of the first and second compared clock signals are substantially the same;
   wherein the receiving circuit further comprises:
   a second clock intermediate circuit for receiving the second compared clock signal; and
   a second flip-flop, for receiving the first compared data signal, transmitted from the first data intermediate circuit, and the second compared data signal, transmitted from the second clock intermediate circuit, so as to generate the second output data signal;
   wherein the first and second flip-flops are positive edge-triggered and negative edge-triggered, respectively;
   wherein at least one of the clock bias current and the data bias current is adjusted such that the setup time and the hold time formed by the first compared data signal and the second compared clock signal match the setup time and the hold time required by the second flip-flop.

3. The receiving circuit according to claim 2, wherein the receiving circuit further comprises a third flip-flop, for receiving the second output data signal, transmitted from the second flip-flop, and the first compared clock signal, transmitted from the first clock intermediate circuit, so as to generate a third output data signal, wherein the third flip-flop is positive edge-triggered.

4. The receiving circuit according to claim 2, wherein the first clock intermediate circuit further comprises:
   a first clock wire, for receiving the first compared clock signal transmitted from the clock comparator; and
   at least one first buffer, for receiving and buffering the first compared clock signal, and transmitting the first compared clock signal to the first flip-flop.

5. The receiving circuit according to claim 4, wherein the second clock intermediate circuit further comprises:
   a second clock wire, for receiving the second compared clock signal transmitted from the clock comparator; and
   at least one second buffer, for receiving and buffering the second compared clock signal, and transmitting the second compared clock signal to the second flip-flop.

6. The receiving circuit according to claim 5, wherein the first and second clock wires have the same lengths.

7. The receiving circuit according to claim 2, wherein the first data intermediate circuit further comprises:
   a first data wire, for receiving the compared data signal transmitted from the first data comparator; and
   at least one buffer, for receiving and buffering the compared data signal, and transmitting the compared data signal to the first flip-flop.

8. The receiving circuit according to claim 7, wherein the receiving circuit further comprises:
   a second data comparator, for receiving a second data signal to generate a second compared data signal;
   a second data intermediate circuit, for receiving the second compared data signal; and
   a fourth flip-flop, for receiving the second compared data signal, transmitted from the second data intermediate circuit, and the first compared data signal, transmitted from the first clock intermediate circuit, so as to generate a fourth output data signal.

9. The receiving circuit according to claim 8, wherein the second data intermediate circuit further comprises;

a second data wire, for receiving the second compared data signal transmitted from the second data comparator; and at least one second buffer, for receiving and buffering the second compared data signal, and transmitting the second compared data signal to the fourth flip-flop;

wherein the first and second data wires have the same lengths.

10. The receiving circuit according to claim 7, wherein the first clock intermediate circuit further comprises:

a first clock wire, for receiving the first compared clock signal transmitted from the clock comparator; and at least one buffer, for receiving and buffering the first compared clock signal, and transmitting the first compared clock signal to the first flip-flop.

11. The receiving circuit according to claim 10, wherein the first clock wire is shorter than the first data wire.

12. A method for receiving a RSDS signal for a receiving circuit which comprises a first data comparator, a clock comparator and a first flip-flop, the method comprising:

driving the first data comparator with a data bias current, so that the first data comparator receives the first data signal to generate a first compared data signal to the first flip-flop;

driving the clock comparator with a clock bias current, so that the clock comparator receives the clock signal to generate a first compared clock signal to the first flip-flop; and adjusting at least one of the clock bias current and the data bias current, such that the setup time and the hold time formed by the first compared data signal and the first compared clock signal match the setup time and the hold time required by the first flip-flop, and such that the first flip-flop generates a first output data signal according to the first compared data signal and the first compared clock signal.

13. The method according to claim 12, wherein the receiving circuit further comprises a second flip-flop, in the step of driving the clock comparator, drive the clock comparator with the clock bias current, so that the clock comparator receives the clock signal to generate the first compared clock signal and a second compared clock signal to the first and second flip-flops, respectively;

wherein the polarities of the first and second compared clock signal are inverse to each other, one of the first and second flip-flops is positive edge-triggered, while the other one of the first and second flip-flops is negative edge-triggered.

14. The method according to claim 13, wherein in the step of adjusting the clock bias current and the data bias current, adjusting at least one of the clock bias current and the data bias current, such that the setup time and the hold time formed by the first compared data signal and the second compared clock signal match the setup time and the hold time required by the second flip-flop, and such that the second flip-flop generates a second output data signal according to the first compared data signal and the second compared clock signal.

* * * * *